United States Patent
Tanimoto

(10) Patent No.: US 9,521,012 B2
(45) Date of Patent: Dec. 13, 2016

(54) RELAY SERVER AND RELAY COMMUNICATION SYSTEM

(75) Inventor: Yoshifumi Tanimoto, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 305 days.

(21) Appl. No.: 13/497,535

(22) PCT Filed: Sep. 17, 2010

(86) PCT No.: PCT/JP2010/005680
§ 371 (c)(1),
(2), (4) Date: Mar. 22, 2012

(87) PCT Pub. No.: WO2011/039967
PCT Pub. Date: Apr. 7, 2011

(65) Prior Publication Data
US 2012/0179838 A1    Jul. 12, 2012

(30) Foreign Application Priority Data

Oct. 2, 2009  (JP) ................................ 2009-230604

(51) Int. Cl.
*G06F 15/173* (2006.01)
*H04L 12/46* (2006.01)

(52) U.S. Cl.
CPC ................................ *H04L 12/4675* (2013.01)

(58) Field of Classification Search
CPC .... H04L 12/4641; H04L 29/06; H04L 49/351; H04L 49/90; H04L 67/1097; H04L 41/0213; H04L 41/082; H04L 43/106; H04L 49/354; H04L 61/2015; H04L 63/10; H04L 12/4675; H04L 63/0281; H04L 63/00; H04L 63/20; G06F 9/45558; G06F 17/3089; G06F 21/602; G06F 21/78; G06F 21/80

(Continued)

(56) References Cited

U.S. PATENT DOCUMENTS

2002/0146002 A1* 10/2002 Sato .............................. 370/386
2002/0156613 A1* 10/2002 Geng ...................... H04L 12/28
                                                                703/23

(Continued)

FOREIGN PATENT DOCUMENTS

JP          2002-217938 A      8/2002
JP          2002-314573 A     10/2002
(Continued)

OTHER PUBLICATIONS

Official Communication issued in International Patent Application No. PCT/JP2010/005680, mailed on Oct. 26, 2010.

(Continued)

*Primary Examiner* — Brian J Gillis
*Assistant Examiner* — Thao Duong
(74) *Attorney, Agent, or Firm* — Keating & Bennett, LLP

(57) ABSTRACT

A virtual network is dynamically created to construct a relay communication system. Between a first relay server and a second relay server, a VLAN device information sharing unit shares VLAN device information including interface information of client terminals capable of functioning as VLAN devices in a relay group. A VLAN group information creation unit edits the VLAN device information, thereby creating VLAN group information formed by grouping the client terminals indicated in the VLAN device information. A VLAN group information sharing unit shares the VLAN group information among the first relay server, the second relay server, the client terminal connected to the first relay (Continued)

server, and the client terminal connected to the second relay server.

10 Claims, 14 Drawing Sheets

(58) Field of Classification Search
USPC ....... 709/203, 205, 213, 216, 217, 218, 219, 709/224, 227, 238, 242, 249
See application file for complete search history.

(56) References Cited

U.S. PATENT DOCUMENTS

| | | | |
|---|---|---|---|
| 2003/0212781 A1* | 11/2003 | Kaneda et al. | 709/223 |
| 2004/0037295 A1* | 2/2004 | Tanaka | H04L 12/4641 370/395.53 |
| 2006/0007939 A1* | 1/2006 | Elangovan | 370/395.53 |
| 2008/0147825 A1* | 6/2008 | Tanimoto | 709/218 |
| 2008/0288591 A1 | 11/2008 | Tanimoto | |
| 2009/0172075 A1 | 7/2009 | Tanimoto | |
| 2010/0054250 A1 | 3/2010 | Kitamura et al. | |

FOREIGN PATENT DOCUMENTS

| | | |
|---|---|---|
| JP | 2008-129991 A | 6/2008 |
| JP | 2008-271015 A | 11/2008 |
| JP | 2008-306500 A | 12/2008 |

OTHER PUBLICATIONS

Ibuki et al., "Network World", Dec. 1, 2004, p. 146-151, vol. 9, No. 12.
English translation of Official Communication issued in corresponding International Application PCT/JP2010/005680, mailed on May 18, 2012.

* cited by examiner

Fig. 8

```
<?xml version="1.0" encoding="UFT-8" ?>
- <root>
  - <site id="serverA@relay.net" name="serverA" stat="active"> }        ─── 301-1
      <node div="dev" group="20070402133100@serverA.relay.net"
        id="clientA1@serverA.relay.net" name="clientA1"
        site="serverA@relay.net" />
      <node div="dev" group="20070402133100@serverA.relay.net"  ─── 302-1
        id="clientA2@serverA.relay.net" name="clientA2"
        site="serverA@relay.net" />
    </site>
  - <site id="serverB@relay.net" name="serverB" stat="active"> }        ─── 301-2
      <node div="dev" group="20070402133100@serverA.relay.net"
        id="clientB1@serverB.relay.net" name="clientB1"
        site="serverB@relay.net" />
      <node div="dev" group="20070402133100@serverA.relay.net"  ─── 302-2
        id="clientB2@serverB.relay.net" name="clientB2"
        site="serverB@relay.net" />
    </site>
  - <site id="serverC@relay.net" name="serverC" stat="active"> }        ─── 301-3
      <node div="dev" group="20070402133100@serverA.relay.net"
        id="clientC1@serverC.relay.net" name="clientC1"
        site="serverC@relay.net" />
      <node div="dev" group="20070402133100@serverA.relay.net"  ─── 302-3
        id="clientC2@serverC.relay.net" name="clientC2"
        site="serverC@relay.net" />
    </site>
</root>
```

```
<?xml version="1.0" encoding="UFT-8" ?>
- <root>
    <node addr="192.168.2.1" div="dev" expr="1213935978484"
      group="20070402133100@serverA.relay.net"
      id="clientA2@serverA.relay.net" name="clientA2" pass="abc"
      port="50700" />
    <node addr="192.168.1.30" div="dev" expr="1213935978484"
      group="20070402133100@serverA.relay.net"
      id="clientA1@serverA.relay.net" name="clientA1" pass="def" port="0" />
</root>
```

```
<?xml version="1.0" encoding="UFT-8" ?>
- <root>
    <node addr="192.100.1.3" div="dev" expr="1213935978484"
      group="20070402133100@serverA.relay.net"
      id="clientB1@serverB.relay.net" name="clientB1" pass="abc"
      port="50700" />
    <node addr="192.100.1.2" div="dev" expr="1213935978484"
      group="20070402133100@serverA.relay.net"
      id="clientB2@serverB.relay.net" name="clientB2" pass="noui"
      port="50700" />
  </root>
```

```
<?xml version="1.0" encoding="UFT-8" ?>
- <root>
    <node addr="200.1.2.1" div="dev" expr="1213935978484"
      group="20070402133100@serverA.relay.net"
      id="clientC1@serverC.relay.net" name="clientC1" pass="abc"
      port="50700" />
    <node addr="200.1.3.200" div="dev" expr="1213935978484"
      group="20070402133100@serverA.relay.net"
      id="clientC2@serverC.relay.net" name="clientC2" pass ="def" port="0" />
  </root>
```

| | client | interface | VLAN |
|---|---|---|---|
| 71-1 | clientA1 | 1 | 0 |
| 71-2 | clientA2 | 1 | 0 |
| 71-3 | clientB1 | 1 | 0 |
| 71-4 | clientB2 | 0 | - |
| 71-5 | clientC1 | 2 | 1 |
| 71-6 | clientC2 | 2 | 1 |

Fig. 13

```
<?xml version="1.0" encoding="UFT-8" ?>
- <root>
    <vlandev id="clientA1@serverA.relay.net" if="1" vlan="1" />    } 71-1
    <vlandev id="clientA2@serverA.relay.net" if="1" vlan="1" />    } 71-2
    <vlandev id="clientB1@serverB.relay.net" if="1" vlan="1" />    } 71-3
    <vlandev id="clientB2@serverB.relay.net" if="0" vlan="0" />    } 71-4
    <vlandev id="clientC1@serverC.relay.net" if="2" vlan="1" />    } 71-5
    <vlandev id="clientC2@serverC.relay.net" if="2" vlan="1" />    } 71-6
</root>
```

| group | client | virtual MAC address | virtual IP address |
|---|---|---|---|
| VLAN groupA | clientA1 | 00-50-81-00-00-01 | 192.168.1.1 |
| | clientC2 | 00-50-81-00-00-02 | 192.168.1.2 |
| VLAN groupB | clientA2 | 00-50-81-00-00-01 | 192.168.1.1 |
| | clientB1 | 00-50-81-00-00-02 | 192.168.1.2 |
| | clientC1 | 00-50-81-00-00-03 | 192.168.1.3 |

Fig. 15

```
<?xml version="1.0" encoding="UFT-8" ?>
- <root>
    - <vlangroup id="20070702203100@serverA.relay.net"                    ~801-1
        lastmod="20070702203100" name="VLANgroupA">
        <dev id="clientA1@serverA.relay.net" mac="005081000001"          ~802-1
            ip="192.168.1.1" />
        <dev id="clientC2@serverC.relay.net" mac="005081000002"          ~802-2
            ip="192.168.1.2" />
    </vlangroup>
    - <vlangroup id="20070802203100@clientA2@serverA.relay.net"          ~801-2
        lastmod="20070802203100" name="VLANgroupB">
        <dev id="clientA2@serverA.relay.net" mac="005081000001"          ~802-3
            ip="192.168.1.1" />
        <dev id="clientB1@serverB.relay.net" mac="005081000002"          ~802-4
            ip="192.168.1.2" />
        <dev id="clientC1@serverC.relay.net" mac="005081000003"          ~802-5
            ip="192.168.1.3" />
    </vlangroup>
</root>
```

80

RELAY SERVER AND RELAY COMMUNICATION SYSTEM

BACKGROUND OF THE INVENTION

1. Field of the Invention

The present invention relates to a relay communication system including a plurality of relay servers capable of communicating with one another, a plurality of client terminals, and LANs to connect the client terminals to the relay servers, and further, relates to the relay servers for use in the relay communication system.

2. Description of the Related Art

In some cases, client terminals connected to remote LANs communicate with one another beyond a WAN. A virtual private network (VPN) can construct a network looking as if the remote LANs were directly connected to one another. However, it is difficult for the VPN to construct a network having expandability and flexibility.

A relay communication system disclosed in Japanese Patent Laid-Open Publication No. 2008-129991, like the VPN, can construct a network looking as if remote LANs were directly connected to one another. In addition, unlike the VPN, it is easy for the relay communication system to construct a network having expandability and flexibility.

In the relay communication system disclosed in Japanese Patent Laid-Open Publication No. 2008-129991, identification information of the client terminals connected to the respective LANs is shared, whereby the communication among the client terminals is enabled. Specifically, association information between identification information of the relay servers and the identification information of the client terminals is shared in the entire network, thereby enabling the relay servers to relay communication packets among the client terminals.

SUMMARY OF THE INVENTION

Preferred embodiments of the present invention dynamically create a virtual network when constructing a relay communication system including a plurality of relay servers capable of communicating with one another.

A relay server according to a preferred embodiment of the present invention is capable of communicating with a first relay server connected to a first network, and the relay server functions as a second relay server connected to a second network. The relay server includes: a relay group information sharing unit; a relay server information sharing unit; a VLAN device information sharing unit; a VLAN group information creation unit; a VLAN group information sharing unit; and a VLAN session establishment unit. The relay group information sharing unit shares relay group information between the first relay server and the second relay server. The relay group information indicates that the first relay server and the second relay server constitute a relay group. The relay server information sharing unit shares relay server information between the first relay server and the second relay server. The relay server information includes activation information of the first relay server, activation information of the second relay server, activation/registration information of a client terminal connected to the first relay server, and activation/registration information of a client terminal connected to the second relay server. The VLAN device information sharing unit shares VLAN device information between the first relay server and the second relay server. The VLAN device information includes interface information of a plurality of client terminals capable of functioning as VLAN devices. The VLAN group information creation unit groups a plurality of client terminals selected from the VLAN device information into a plurality of VLAN groups, and creates VLAN group information. The VLAN group information includes virtual addresses assigned individually to the selected client terminals so that no repeated virtual addresses are included in the same VLAN group. The VLAN group information sharing unit shares the VLAN group information among the first relay server, the second relay server, the client terminal connected to the first relay server, and the client terminal connected to the second relay server. The VLAN session establishment unit allows a plurality of client terminals capable of functioning as the VLAN devices to function as VLAN terminals, and while referring to the relay server information, establishes a VLAN session for each group indicated in the VLAN group information.

Note that "VLAN" in preferred embodiments of the present invention refers to a function which allows client terminals present in two or more LANs to function as one Virtual LAN or VLAN through relay servers.

In the relay communication system, the first relay server and the second relay server share the relay group information, the relay server information, the VLAN device information, and the VLAN group information. Moreover, the plurality of relay servers establish the VLAN sessions for each group indicated in the VLAN group information.

At the time when the VLAN sessions are to be established, the relay servers refer to the relay server information, and thereby determine whether or not the terminals in the VLAN group are capable of communicating with one another. Hence, no useless VLAN sessions would be established.

The relay server may further include a VLAN connection function control unit that validates/invalidates a VLAN connection function for each group indicated in the VLAN group information. In this case, such validation/invalidation of the VLAN connection function is actually switched by the VLAN connection function control unit.

The relay server may further include a display device that displays the VLAN device information. In this case, the user creates the VLAN group information while looking at the VLAN device information, and can thereby set routes for a plurality of the VLAN sessions. That is to say, it is easy to set the routes for the VLAN sessions.

The relay server may further include a VLAN device information update unit that updates the VLAN device information in response to status changes of interfaces of the client terminals capable of functioning as the VLAN devices. In this case, it is possible to share the latest VLAN device information in real time among the respective terminals.

The VLAN device information may include names of the client terminals, and the number of the interfaces functioning as the VLAN terminals.

In this case, based on the number of the interfaces functioning as the VLAN terminals, it can be determined whether or not the client terminals function as the VLAN terminals.

The virtual addresses may include virtual MAC addresses.

If a plurality of VLAN sessions are established between the first relay server and the second relay server, one of the routes between the first relay server and the second relay server may be shared among at least two VLAN sessions.

A relay communication system according to another preferred embodiment of the present invention includes: a first network; a second network; a first relay server connected to the first network; and a second relay server connected to the second network. Each of the first relay server and the second relay server includes a relay server information sharing unit; a VLAN device information sharing unit; a VLAN group information creation unit; a VLAN group information sharing unit; and a VLAN session establishment unit.

The relay server information sharing unit shares relay server information between the first relay server and the second relay server. The relay server information includes activation information of the first relay server, activation information of the second relay server, activation/registration information of a client terminal connected to the first relay server, and activation/registration information of a client terminal connected to the second relay server. The VLAN device information sharing unit shares VLAN device information between the first relay server and the second relay server. The VLAN device information includes interface information of a plurality of client terminals capable of functioning as VLAN devices. The VLAN group information creation unit groups a plurality of client terminals selected from the VLAN device information into a plurality of VLAN groups, and creates VLAN group information. The VLAN group information includes virtual addresses assigned individually to the selected client terminals so that no repeated virtual addresses are included in the same VLAN group. The VLAN group information sharing unit shares the VLAN group information among the first relay server, the second relay server, the client terminal connected to the first relay server, and the client terminal connected to the second relay server. The VLAN session establishment unit allows a plurality of client terminals capable of functioning as the VLAN devices to function as VLAN terminals, and while referring to the relay server information, establishes a VLAN session for each group indicated in the VLAN group information.

With the relay server and the relay communication system according to various preferred embodiments of the present invention, the virtual network can be dynamically created when constructing the relay communication system including the plurality of relay servers capable of communicating with one another.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8 is a view showing a detailed configuration of the relay server information.

FIG. 9 is a view showing a schematic configuration of client terminal information stored in the first relay server.

FIG. 10 is a view showing a schematic configuration of client terminal information stored in a second relay server.

FIG. 11 is a view showing a schematic configuration of client terminal information stored in a third relay server.

FIG. 12 is a view showing a schematic configuration of VLAN device information.

FIG. 13 is a view showing a detailed configuration of the VLAN device information.

FIG. 14 is a view showing a schematic configuration of VLAN group information.

FIG. 15 is a view showing a detailed configuration of the VLAN group information.

DETAILED DESCRIPTION OF THE PREFERRED EMBODIMENTS

First Preferred Embodiment

In a relay communication system according to a first preferred embodiment, client terminals become capable of communicating as VLAN devices with one another beyond a WAN through a plurality of relay servers which realize a function similar to that of a hub.

Figure 1:
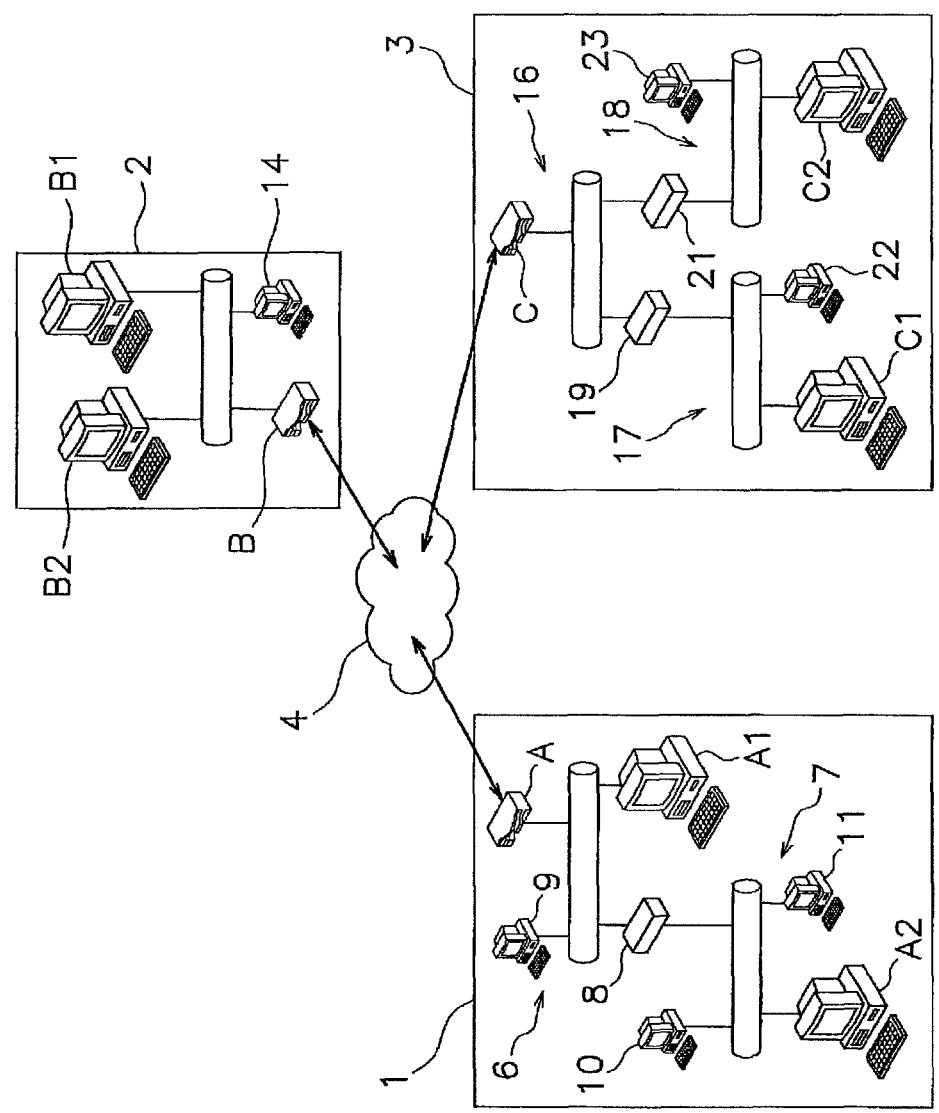
FIG. 1 is a schematic view showing an overall configuration of a relay communication system.

FIG. 1 shows an overall configuration of a relay communication system. The relay communication system preferably includes a first LAN 1, a second LAN 2, a third LAN 3, and a WAN 4. The first LAN 1, the second LAN 2 and the third LAN 3 are small-scale networks constructed remotely from one another. The WAN 4 is a large-scale network such as the Internet, for example.

As will be described later in detail, a first relay server A of the first LAN 1, a second relay server B of the second LAN 2, and a third relay server C of the third LAN 3 define a first relay server group.

The first LAN 1 includes a fourth LAN 6 and a fifth LAN 7, which are connected to each other by a first general-purpose router 8. In the fourth LAN 6, the first relay server A, a first client terminal A1 and a first communication instrument 9 are connected to one another. In the fifth LAN 7, a second client terminal A2, a second communication instrument 10 and a third communication instrument 11 are connected to one another.

In the second LAN 2, the second relay server B, a third client terminal B1, a fourth client terminal B2 and a fourth communication instrument 14 are connected to one another.

The third LAN 3 includes a sixth LAN 16, a seventh LAN 17 and an eighth LAN 18, the sixth LAN 16 and the seventh LAN 17 are connected to each other by a second general-purpose router 19, and the sixth LAN 16 and the eighth LAN 18 are connected to each other by a third general-purpose router 21. The third relay server C belongs to the sixth LAN 16. In the seventh LAN 17, a fifth client terminal C1 and a fifth communication instrument 22 are connected to each other. In the eighth LAN 18, a sixth client terminal C2 and a sixth communication instrument 23 are connected to each other.

The first client terminal A1, the second client terminal A2, the third client terminal B1, the fourth client terminal B2, the fifth client terminal C1 and the sixth client terminal C2 are, for example, personal computers. The first communication instrument 9, the second communication instrument 10, the third communication instrument 11, the fourth communication instrument 14, the fifth communication instrument 22 and the sixth communication instrument 23 are also, for example, personal computers.

The first relay server A, the second relay server B and the third relay server C relay communication among the first client terminal A1, the second client terminal A2, the third client terminal B1, the fourth client terminal B2, the fifth client terminal C1 and the sixth client terminal C2. The WAN 4 relays communication among the first relay server A, the second relay server B and the third relay server C.

Note that communication protocol used among the first relay server A, the second relay server B and the third relay server C is not particularly limited.

The relay servers are connected not only to the LANs but also to the WAN. The relay servers are capable of communicating with each of client terminals connected to the same LANs, and in addition, are capable of communicating with the relay servers located in the other LANs. Therefore, in addition to a private IP address, a global IP address is assigned to each of the relay servers.

Figure 2:
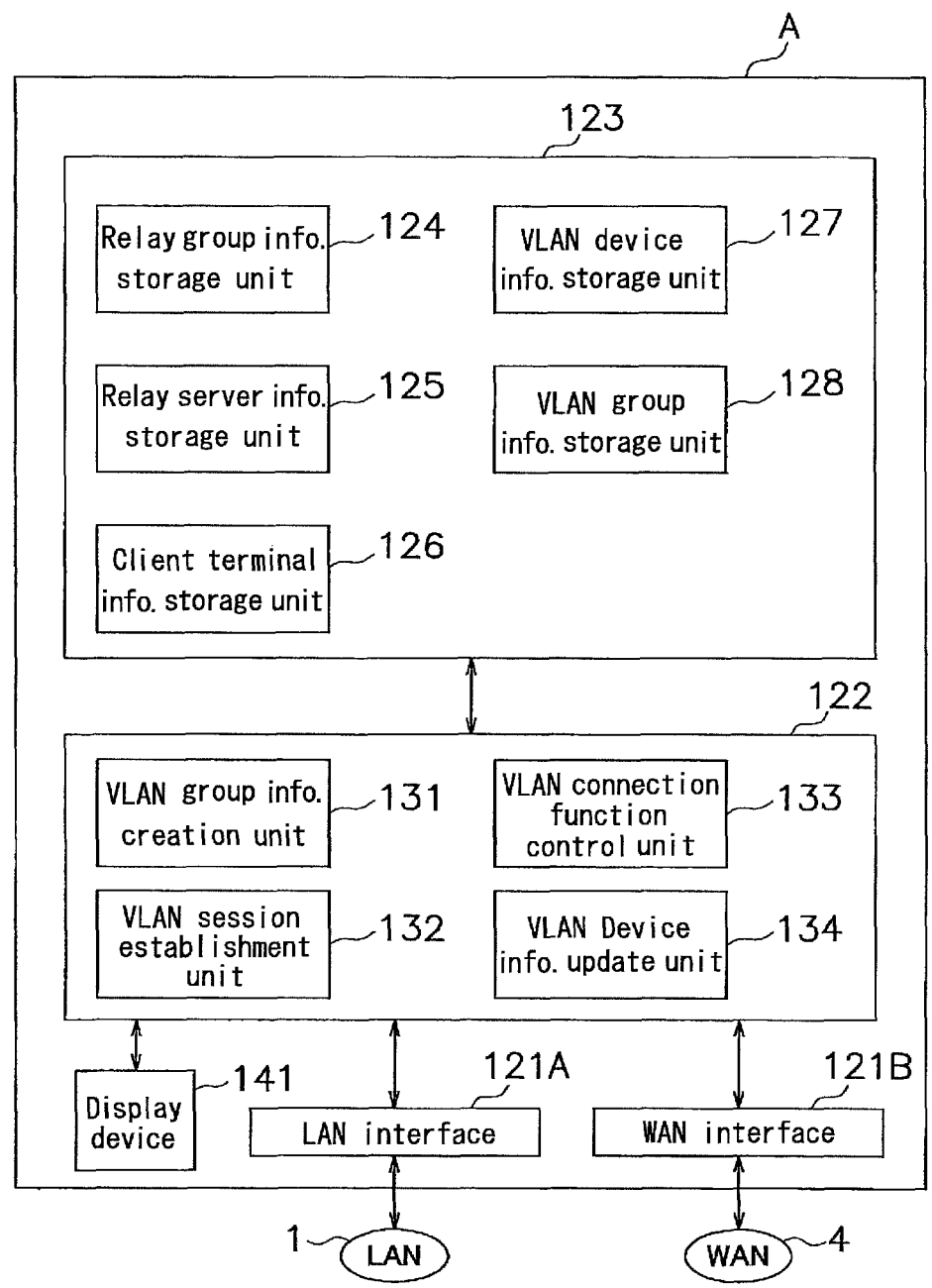
FIG. 2 is a block diagram showing a configuration of a first relay server.

FIG. 2 shows constituent elements of the first relay server A.

The first relay server A includes a LAN interface 121A, a WAN interface 121B, a control unit 122, a database storage unit 123, and a display device 141.

By using the private IP address, the LAN interface 121A performs communication with the terminals in the first LAN 1. The WAN interface 121B performs communication with the WAN 4 by using the global IP address.

The control unit 122 is, for example, a CPU having functions to perform control and arithmetic operations, and is capable of executing a variety of processing based on programs loaded thereon. The control unit 122 is a processing unit that controls various communications performed through the LAN interface 121A and the WAN interface 121B, and the control unit 122 controls a variety of communication processing that follows protocols such as TCP/IP, UDP, and SIP. Moreover, the control unit 122 creates or updates information to be stored in the database storage unit 123. The control unit 122 includes a VLAN group information creation unit 131, a VLAN session establishment unit 132, a VLAN connection function control unit 133, and a VLAN device information update unit 134. The VLAN group information creation unit 131 creates VLAN group information, and stores the created VLAN group information in a VLAN group information storage unit 128. The VLAN session establishment unit 132 establishes a VLAN session, which allows the client terminals to function as VLAN terminals, for each group indicated in the VLAN group information while referring to relay server information. The VLAN connection function control unit 133 validates/invalidates a VLAN session function for each group indicated in the VLAN group information. The VLAN device information update unit 134 updates VLAN device information in response to a change of a status of an interface of each of the client terminals. Details of the relay server information, the VLAN device information and the VLAN group information will be described later.

The database storage unit 123 is, for example, a hard disk or a nonvolatile RAM, and is capable of storing a variety of data. The database storage unit 123 includes a relay group information storage unit 124, a relay server information storage unit 125, a client terminal information storage unit 126, a VLAN device information storage unit 127, and a VLAN group information storage unit 128.

Note that, since constituent elements of the second relay server B and the third relay server C are similar to those of the first relay server A, a description thereof is omitted.

Each of the client terminals is a terminal directly operable by a user. Each of the client terminals is, for example, a personal computer to be used by the user for daily business operations. To each of the client terminals, a private IP address is assigned, which is uniquely managed in a same LAN.

Figure 3:
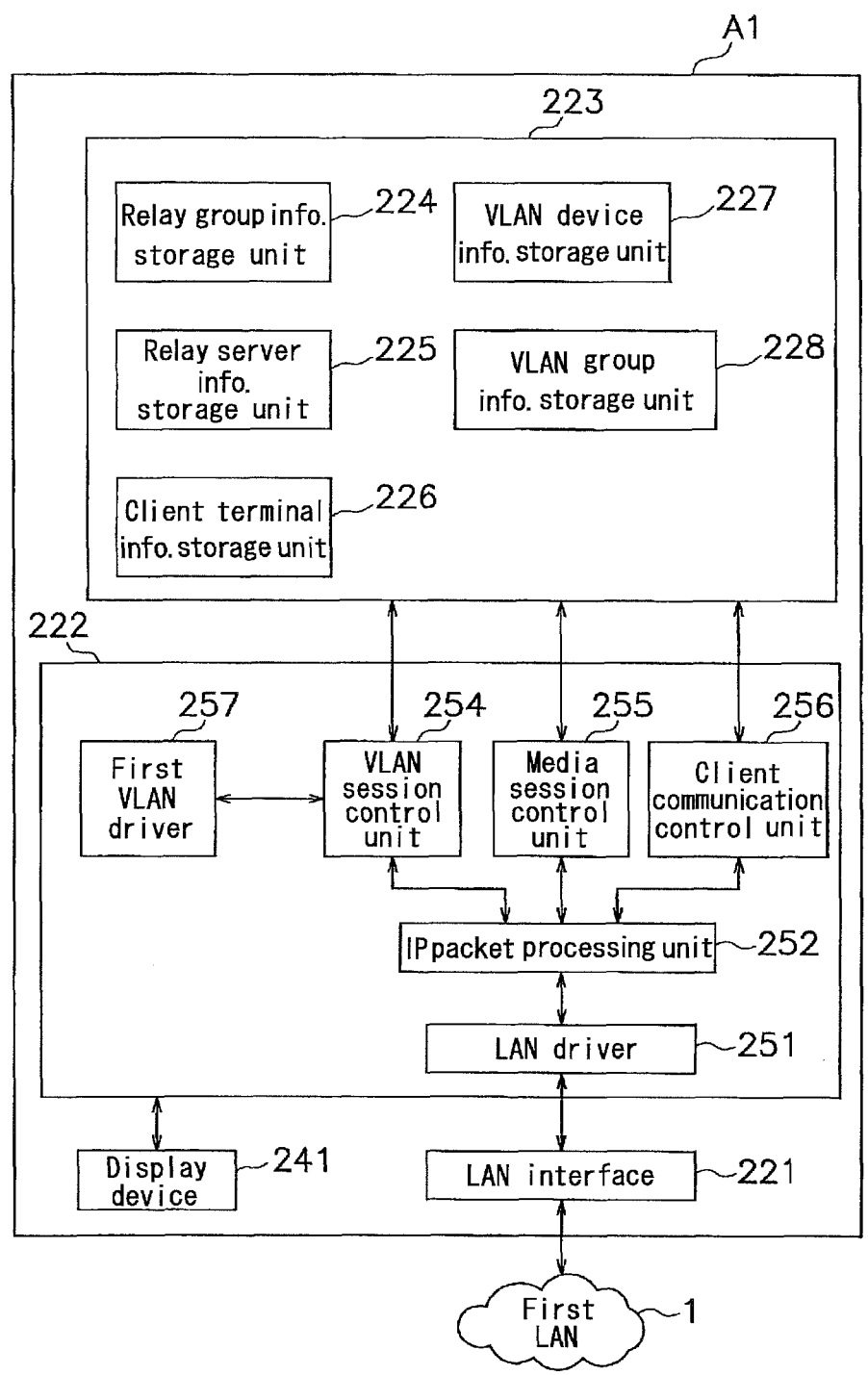
FIG. 3 is a block diagram showing a first client terminal.

FIG. 3 shows constituent elements of the first client terminal A1. The first client terminal A1 includes a LAN interface 221, a control unit 222, a database storage unit 223, and a display device 241.

The LAN interface 221 performs communication with the first relay server A and other terminals in the first LAN 1 by using the private IP address.

The control unit 222 is, for example, a CPU having functions to perform control and arithmetic operations, and is capable of executing a variety of processing based on programs loaded thereon. The control unit 222 is a processing unit that controls various communications performed through the LAN interface 221, and the control unit 222 controls a variety of communication processing that follows protocols such as TCP/IP, UDP, and SIP, for example. The control unit 222 includes a LAN driver 251, an IP packet processing unit 252, a VLAN session control unit 254, a media session control unit 255, a client communication control unit 256, and a first VLAN driver 257.

The LAN driver 251 is driver software that controls the LAN interface 221.

The IP packet processing unit 252 analyzes a communication packet received from the LAN driver 251, outputs the communication packet to the VLAN session control unit 254 if the communication packet includes data regarding the VLAN session, outputs the communication packet to the media session control unit 255 if the data concerned is data regarding a usual media session, and outputs the communication packet to the client communication control unit 256 if other data is included therein. Moreover, in contrast to the above, the IP packet processing unit 252 outputs data received from each of the control units, as IP packets to the LAN driver 251.

The VLAN session control unit 254 allows a specific media session to function as the VLAN session. Specifically, the VLAN session control unit 254 outputs the data to the first VLAN driver 257 based on a virtual MAC address included in the data.

The first VLAN driver 257 functions as a usual LAN driver in the first client terminal A1. The first VLAN driver 257 corresponds to a predetermined virtual MAC address.

The media session control unit 255 controls the usual media session. The client communication control unit 256 processes packets other than those of the VLAN session and the usual media session.

Moreover, the control unit 222 creates or updates the following information to be stored in the database storage unit 223.

The database storage unit 223 is, for example, a hard disk or a nonvolatile RAM, and is capable of storing a variety of data. The database storage unit 223 includes a relay group information storage unit 224, a relay server information storage unit 225, a client terminal information storage unit 226, a VLAN device information storage unit 227, and a VLAN group information storage unit 228.

Figure 4:
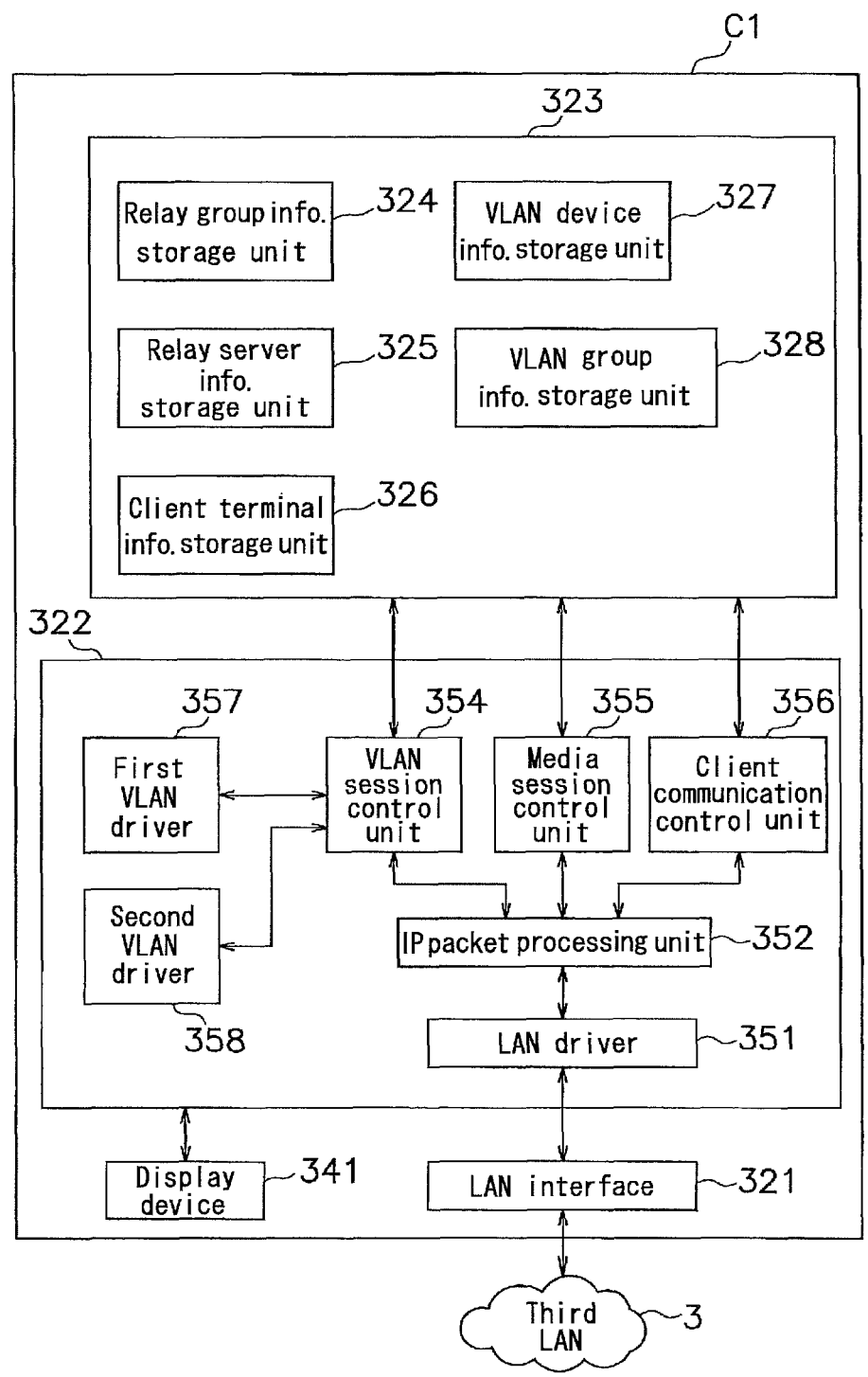
FIG. 4 is a block diagram showing a configuration of a fifth client terminal.

FIG. 4 shows constituent elements of the fifth client terminal C1. The fifth client terminal C1 includes a LAN interface 321, a control unit 322, and a database storage unit 323. The LAN interface 321 performs communication with the third relay server C and other terminals in the third LAN 3 by using the private IP address.

The fifth client terminal C1 is different from the first client terminal A1 in that there are plural VLAN drivers in the fifth client terminal C1.

The control unit 322 includes a first VLAN driver 357, and a second VLAN driver 358. Each of the first VLAN driver 357 and the second VLAN driver 358 functions as a usual LAN driver in the fifth client terminal C1. The first VLAN driver 357 and the second VLAN driver 358 correspond to virtual MAC addresses different from each other.

Figure 5:
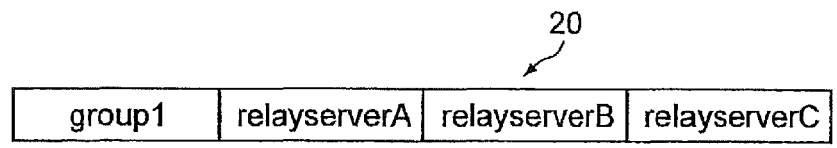
FIG. 5 is a view showing a schematic configuration of relay group information.

FIG. 5 shows a schematic configuration of relay group information 20. The relay group information is information indicating an outline of each relay group in the relay communication system. FIG. 5 shows that a first relay group includes the first relay server A, the second relay server B and the third relay server C.

Figure 6:
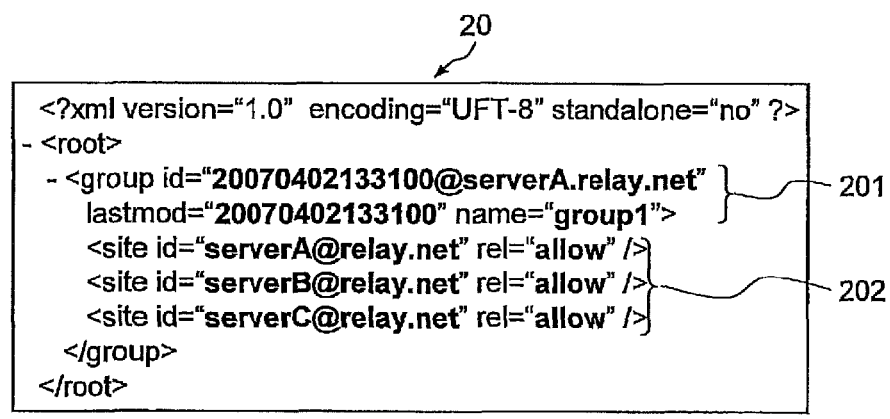
FIG. 6 is a view showing a detailed configuration of the relay group information.

FIG. 6 shows a detailed configuration of the relay group information 20. The relay group information 20 includes upper information 201 and lower information 202.

The upper information 201 is information of the first relay group itself. "group id" indicates identification information of the relay group. "lastmod" indicates a latest update time of the relay group information. "name" indicates a name of the relay group.

The lower information 202 is information regarding the first relay server A, the second relay server B and the third relay server C. "site id" indicates identification information of the relay servers.

The relay group information 20 is stored in the relay group information storage unit 124 of each relay server. That is to say, the relay group information 20 is shared among the first relay server A, the second relay server B and the third relay server C. Moreover, the relay group information 20 is also shared between each relay server and each client terminal. For example, the relay group information 20 is stored in the relay group information storage unit 224 of the first client terminal A1 and the relay group information storage unit 324 of the sixth client terminal C2.

Figure 7:
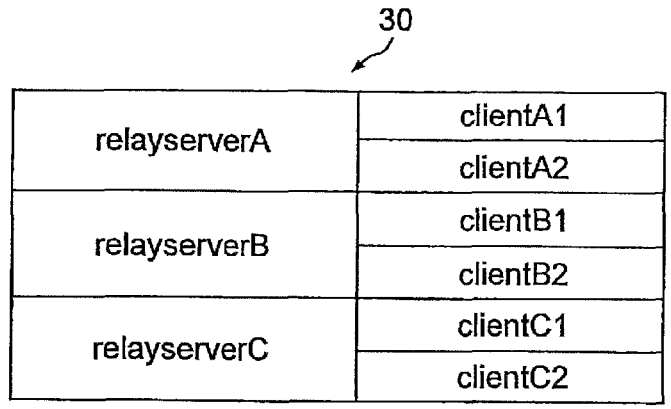
FIG. 7 is a view showing a schematic configuration of relay server information.

FIG. 7 shows a schematic configuration of an example of relay server information 30. The relay server information is information indicating an outline of the relay servers and the client terminals, which are included the relay communication system.

As shown in FIG. 7, the first client terminal A1 and the second client terminal A2 are connected to the first relay server A. The third client terminal B1 and the fourth client terminal B2 are connected to the second relay server B. The fifth client terminal C1 and the sixth client terminal C2 are connected to the third relay server C.

FIG. 8 shows a detailed configuration of the relay server information 30. The relay server information 30 includes upper information 301-1, 301-2 and 301-3, and lower information 302-1, 302-2 and 302-3.

Each of the upper information 301-1, 301-2 and 301-3 is information regarding the relay server. "site id" indicates identification information of the relay server. "name" indicates a name of the relay server. "stat" indicates information as to whether or not the relay server is activated.

Each of the lower information 302-1, 302-2 and 302-3 is information regarding the client terminal. "div" indicates a division name of the client terminal. "group" indicates identification information of the relay group to which the client terminal belongs. "id" indicates identification information of the client terminal. "name" indicates a name of the client terminal. "site" indicates identification information of the relay server that serves as a log-on destination when the client terminal is logged on.

The relay server information 30 is stored in the relay server information storage unit 125. That is to say, the relay server information 30 is shared among the first relay server A, the second relay server B and the third relay server C. Moreover, the relay server information 30 is shared between each relay server and each client terminal. For example, the relay server information 30 is stored in the relay server information storage unit 225 of the first client terminal A1 and the relay server information storage unit 325 of the fifth client terminal C1.

When the relay servers are activated, "stat" in the upper information 301-1, 301-2 and 301-3 are "active". When a relay server is not activated, "stat" is blank. In such a way, the information as to whether or not a relay server is activated is shared in the entire relay communication system.

When client terminals are logged onto the relay servers, the identification information of the relay servers that serve as the log-on destinations of the client terminals is recorded in "site" of the lower information 302-1, 302-2 and 302-3. When a client terminal is not logged onto the relay server, "site" is blank. In such a way, the information as to whether or not a client terminal is logged onto the relay server is shared in the entire the relay communication system.

FIG. 9, FIG. 10 and FIG. 11 show client terminal information 40, 50 and 60, respectively, as specific examples of client terminal information. The client terminal information is information indicating details of the client terminals which are included in the relay communication system.

"addr" is address information of a client terminal, and specifically, indicates an IP address of the client terminal. "div" indicates a division name of the client terminal. "expr" is expiration period information of the client terminal, and specifically, indicates a registration expiration period of the client terminal. "group" indicates identification information of a relay group to which the client terminal belongs. "id" indicates identification information of the client terminal. "name" indicates a name of the client terminal. "pass" indicates a password of the client terminal. "port" is port information of the client terminal, and specifically, indicates a port number of the client terminal.

The client terminal information 40 is stored in the client terminal information storage unit 126 of the first relay server A. The client terminal information 50 is stored in the client terminal information storage unit 126 of the second relay server B. The client terminal information 60 is stored in the client terminal information storage unit 126 of the third relay server C. The client terminal information 60 is further stored, for example, in the client terminal information storage unit 226 of the first client terminal A1 and the client terminal information storage unit 326 of the fifth client terminal C1.

The VLAN device information is information that preferably includes the number of owned VLAN interfaces owned in each of the client terminals; and the number of VLAN interfaces in use among the VLAN interfaces. Here, when the fact that the number of owned VLAN interfaces is set at zero, it indicates that the client terminal concerned therewith does not function as a VLAN terminal.

FIG. 12 shows a schematic configuration of VLAN device information 70. The VLAN device information 70 is divided into first VLAN device information 71-1, second VLAN device information 71-2, third VLAN device information 71-3, fourth VLAN device information 71-4, fifth VLAN device information 71-5 and sixth VLAN device information 71-6.

The first VLAN device information 71-1 indicates the number of interfaces owned and the number of interfaces in use in the first client terminal A1. In this case, the number of owned interfaces is one, and the number of interfaces in use is zero.

The second VLAN device information 71-2 indicates the number of interfaces owned and the number of interfaces in use in the second client terminal A2. In this case, the number of owned interfaces is one, and the number of interfaces in use is zero.

The third VLAN device information 71-3 indicates the number of owned interfaces and the number of interfaces in use in the third client terminal B1. In this case, the number of owned interfaces is one, and the number of interfaces in use is zero.

The fourth VLAN device information 71-4 indicates the number of interfaces owned and the number of interfaces in use in the fourth client terminal B2. In this case, the number of owned interfaces is zero, and the number of interfaces in use is not recorded. This indicates that the fourth client terminal B2 does not function as a VLAN terminal.

The fifth VLAN device information 71-5 indicates the number of interfaces owned and the number of interfaces in use in the fifth client terminal C1. In this case, the number of owned interfaces is two, and the number of interfaces in use is one.

The sixth VLAN device information 71-6 indicates the number of interfaces owned and the number of interfaces in use in the sixth client terminal C2. In this case, the number of owned interfaces is two, and the number of interfaces in use is one.

FIG. 13 shows a detailed configuration of the VLAN device information 70. "vlandev id" indicates identification information of each client terminal. "if" indicates the number of owned interfaces. "vlan" indicates the number of interfaces in use.

The VLAN group information is information constructed such that the virtual MAC addresses and virtual IP addresses, which are assigned to respective client terminals, are divided into a plurality of groups.

A description is now provided of creation of the VLAN group information. The VLAN group information is associated with the relay group information. When a user selects a relay group at a terminal, the VLAN device information corresponding thereto is displayed on the display. While looking at the VLAN device information on the display of the relay server, the client terminal or the communication instrument, the user divides the client terminals into a plurality of groups, thereby creating the VLAN group information. Specifically, based on an instruction from the user, the control unit of the relay server creates the VLAN group information, and stores the created VLAN group information in the VLAN group information storage unit.

FIG. 14 shows a schematic configuration of VLAN group information 80. The VLAN group information 80 is divided into a VLAN group A and a VLAN group B. The first client terminal A1 and the sixth client terminal C2 belong to the VLAN group A. The second client terminal A2, the third client terminal B1 and the fifth client terminal C1 belong to the VLAN group B.

Moreover, the VLAN group information includes, as attribute information, the virtual MAC addresses and virtual IP addresses of the respective client terminals. The virtual MAC addresses and the virtual IP addresses are automatically assigned, in a way such that no repeated addresses are included in a same VLAN group at the time when the VLAN group information is created.

FIG. 15 shows a detailed configuration of the VLAN group information 80. The VLAN group information 80 includes: upper information 801-1 and 801-2; and lower information 802-1, 802-2, 802-3, 802-4 and 802-5.

The upper information is information regarding the VLAN group. In each of the upper information 801-1 and 801-2, "vlangroup id" indicates identification information of the VLAN group. "lastmod" indicates a latest update time of the VLAN group information. "name" indicates a name of the VLAN group.

The lower information is information regarding the client terminal. In each of the lower information 802-1, 802-2, 802-3, 802-4 and 802-5, "dev id" indicates identification information of the client terminal. "mac" indicates a MAC address of the client terminal. "ip", indicates an IP address of the client terminal.

Figure 16:
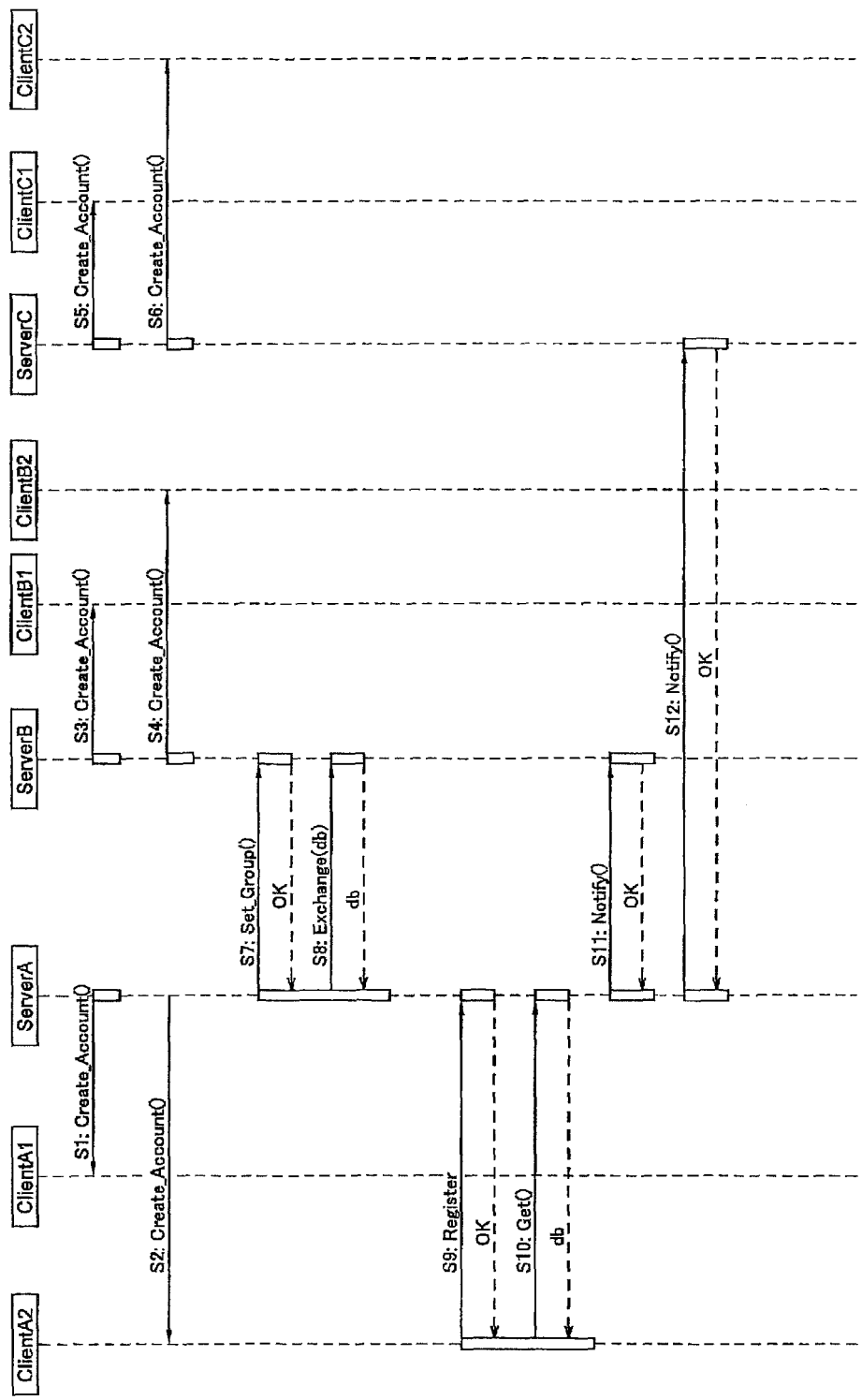
FIG. 16 is a chart showing a flow of processes to construct a relay group.

With reference to the sequence chart of FIG. 16, a description is now provided of initial setting of the first relay group. Specifically, FIG. 16 shows a flow of process regarding creation of the relay group information, the relay server information and the client terminal information.

An administrator of the first relay server A creates accounts for users of the first client terminal A1 and the second client terminal A2 (Step S1, Step S2: Create_Account( )). An administrator of the second relay server B creates accounts for users of the third client terminal B1 and the fourth client terminal B2 (Step S3, Step S4: Create_Account( )). An administrator of the third relay server C creates accounts for users of the fifth client terminal C1 and the sixth client terminal C2 (Step S5, Step S6: Create_Account( )).

In the above-described process, the first relay server A creates and stores a relay server information (described later). The second relay server B creates and stores a relay server information (described later). The third relay server C creates and stores a relay server information (described later). Moreover, the first relay server A creates and stores a client terminal information, the second relay server B creates and stores a client terminal information, and the third relay server C creates and stores a client terminal information.

Figure 17:
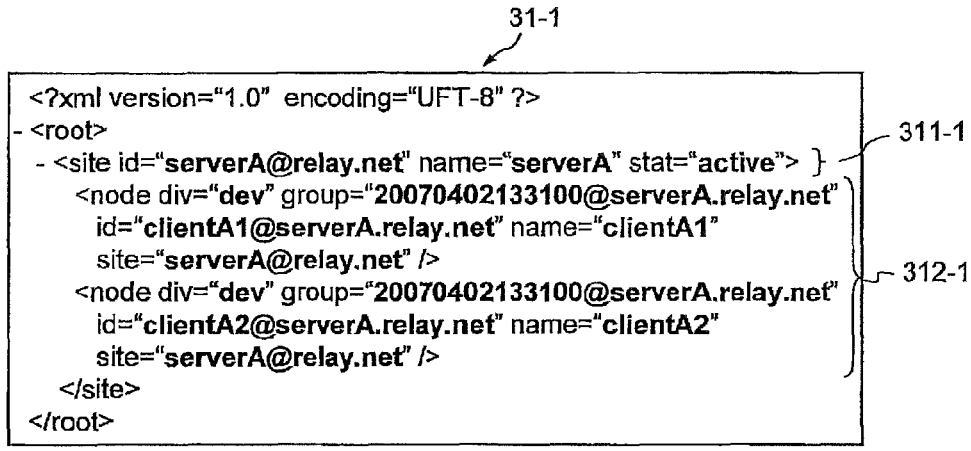
FIG. 17 is a view showing a detailed configuration of relay server information before exchange.
Figure 18:
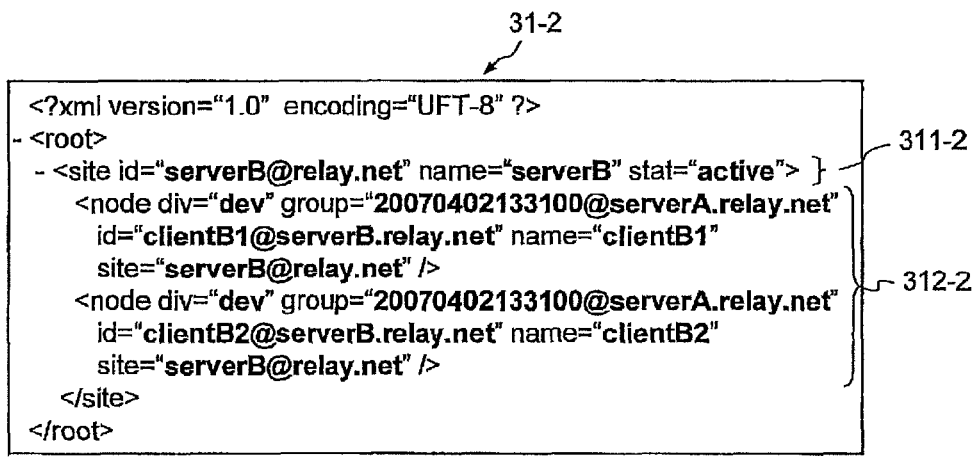
FIG. 18 is a view showing a detailed configuration of relay server information before exchange.
Figure 19:
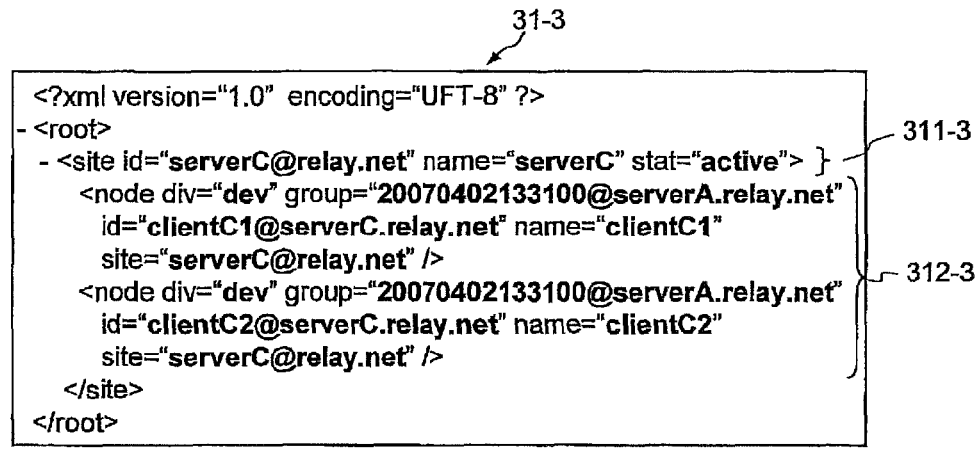
FIG. 19 is a view showing a detailed configuration of relay server information before exchange.

FIG. 17, FIG. 18 and FIG. 19 show relay server information 31-1, relay server information 31-2 and relay server information 31-3, respectively. The relay server information 31-1 is the information created and stored by the first relay server A. The relay server information 31-2 is the information created and stored by the second relay server B. The relay server information 31-3 is the information created and stored by the third relay server C.

FIG. 17 shows the relay server information 31-1. Upper information 311-1 is information about the first relay server A. As "site id", "serverA@relay.net" is set. As "name", "serverA" is set. As "stat", "active" is set.

Lower information 312-1 is information about the first client terminal A1 and the second client terminal A2.

The information about the first client terminal A1 is as follows. As "div", "dev" is set. As "group", "20070402133100@serverA.relay.net" is set. As "id", "clientA1@ServerA.relay.net" is set. As "name", "clientA1" is set. Note that, in FIG. 17, "serverA@relay.net" is set as "site", which indicates that the user of the first client terminal A1 is logged onto the first relay server A; however, in reality, the "site" is blank at a stage of Steps S1 to S6 of FIG. 16.

The information about the second client terminal A2 is as follows. As "div", "dev" is set. As "group", "20070402133100@serverA.relay.net" is set. As "id", "clientA2@serverA.relay.net" is set. As "name", "clientA2" is set. Note that the description for "site" is similar to that of the first client terminal A1.

Contents of the relay server information 31-2 and the relay server information 31-3 are similar to those of the relay server information 31-1, and accordingly, a description thereof is omitted.

In FIG. 16, the first relay server A requests the second relay server B to construct a group of the relay communication system (Step S7: Set_Group( )). The first relay server A and the second relay server B create and store the relay group information. Next, the first relay server A requests the second relay server B to exchange the relay server information (Step S8: Exchange (db)). In such a way, the first relay server A transmits the relay server information to the second relay server B, and the second relay server B transmits the relay server information to the first relay server A. The first relay server A and the second relay server B synthesize the relay server information to create a new relay server information, and store the new relay server information. Note that, though not shown in the figure, processes similar to those of Step S7 and Step S8 are also executed between the first relay server A and the third relay server C, and further, are also executed between the second relay server B and the third relay server C. As a result, a common relay server information is owned by the first relay server A, the second relay server B and the third relay server C.

The user of the second client terminal A2 inputs the identification information and password of the second client terminal A2, and logs on to the first relay server A (Step S9: Register). The first relay server A refers to the client terminal information, and performs user authentication for the second client terminal A2. The first relay server A updates the client terminal information.

Subsequently, the second client terminal A2 requests the first relay server A to provide the relay group information and the relay server information (Step S10: Get( )). The first relay server A transmits the relay group information and the relay server information to the second client terminal A2. The second client terminal A2 stores the relay group information and the relay server information.

The first relay server A refers to the relay server information. When confirming that "site" regarding the second relay server B is "active", the first relay server A determines that the second relay server B should be notified that the relay server information has been updated. The first relay server A notifies the second relay server B that the relay server information has been updated (Step S11: Notify ( )). The second relay server B updates and stores the relay server information. Note that the first relay server A also notifies the third relay server C that the relay server information has been updated (Step S12: Notify ( )).

When the users of the first client terminal A1, the third client terminal B1, the fourth client terminal B2, the fifth client terminal C1 and the sixth client terminal C2 log on to the respective relay servers, the relay server information in the relay servers are updated in a similar way. Moreover, when the users of the respective client terminals log off, the relay server information in the relay servers are also updated in a similar way.

Moreover, the respective client terminals which have logged on are also notified of the updates of the relay server information.

A description is now provided of a sharing process when the information of the relay group is changed.

Figure 20:
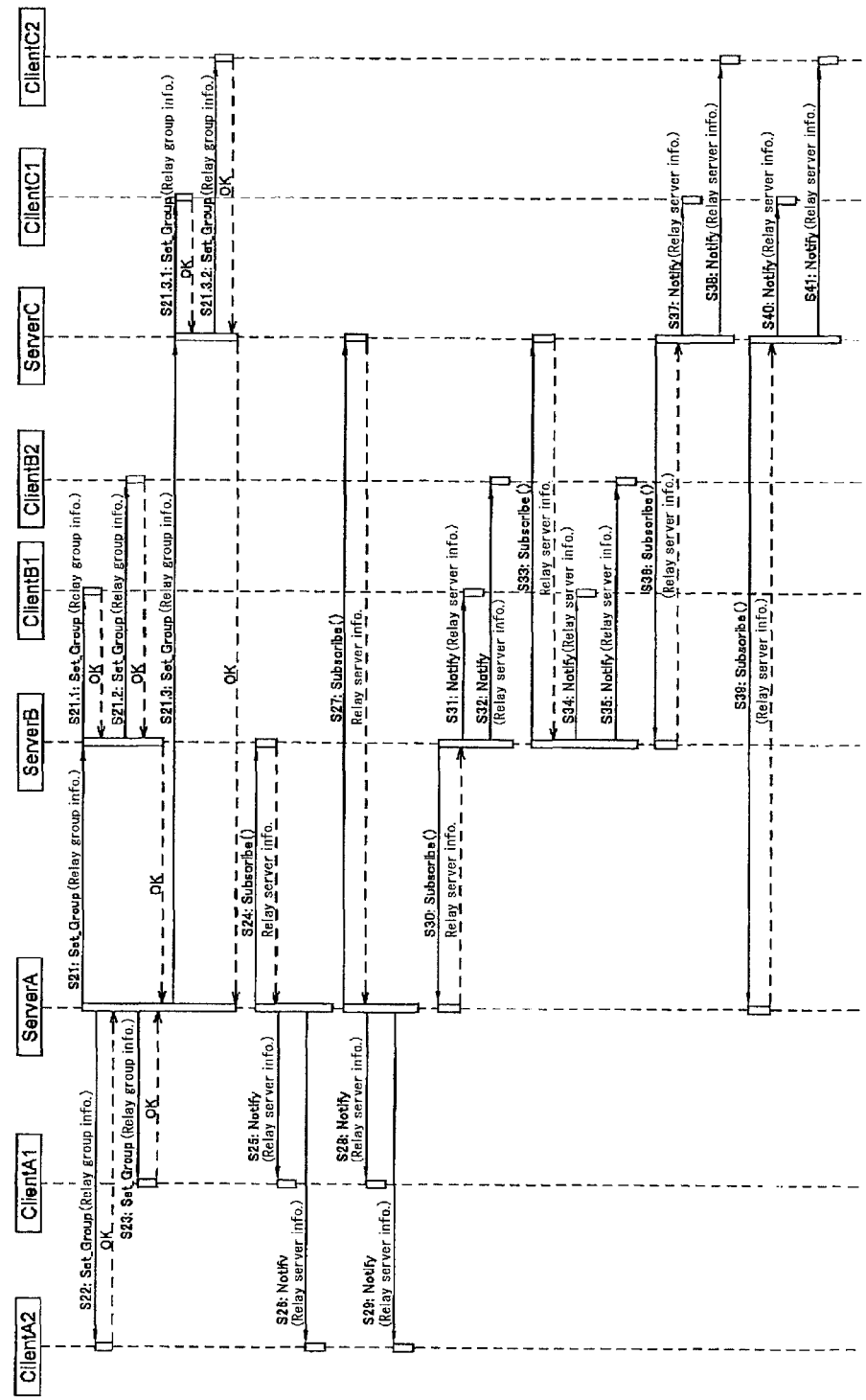
FIG. 20 is a chart showing a flow of process regarding sharing of the relay group information and the relay server information.

In FIG. 20, when a change occurs in the first relay group, for example, the first relay server A transmits such changed relay group information to the second relay server B (Step S21: Set_Group (relay group information)). Then, the second relay server B transmits the relay group information to the third client terminal B1 and the fourth client terminal B2 (Step S21.1 and Step S21.2: Set_Group (relay group information)). When an OK is returned from each of the third client terminal B1 and the fourth client terminal B2, the second relay server B returns an OK to the first relay server A.

Moreover, the first relay server A transmits the changed relay group information to the first client terminal A1 (Step S22: Set_Group (relay group information)). The first client terminal A1 returns an OK to the first relay server A. The first relay server A transmits the changed relay group information to the second client terminal A2 (Step S23: Set_Group (relay group information)). The second client terminal A2 returns an OK to the first relay server A.

The first relay server A transmits the relay group information of the relay communication system to the third relay server C (Step S21.3: Set_Group (relay group information)). Then, the third relay server C transmits the relay group information to the fifth client terminal C1 and the sixth client terminal C2 (Step S21.3.1 and Step S21.3.2: Set_Group (relay group information)). When an OK is returned from each of the fifth client terminal C1 and the sixth client terminal C2, the third relay server C returns an OK to the first relay server A.

Through the above-described process, all of the relay servers and the client terminals share a same relay group information.

A description is now provided of the sharing of the relay server information. Here, the process for the sharing uses a framework of event notification. In the event notification, a subscriber is an agent who requests status notification of a resource, and a reporter is an agent who issues a notice on the status of the resource. When a change occurs in the status of the resource during a subscription period, the subscriber is notified of the change by the reporter.

The first relay server A applies for subscription of the relay server information to the second relay server B (Step S24: Subscribe ( )). When a change occurs in the condition represented by the relay server information, the second relay server B updates the relay server information held thereby. Then, the second relay server B transmits the updated relay server information to the first relay server A. The first relay server A updates the relay server information using the relay server information transmitted from the second relay server B. The first relay server A notifies the first client terminal A1 that the relay server information has been updated (Step S25: Notify (relay server information)), and further notifies the second client terminal A2 of the same (Step S26: Notify (relay server information)).

Next, the first relay server A applies for subscription of the relay server information to the third relay server C (Step S27: Subscribe ( )). When a change occurs in the condition represented by the relay server information, the third relay server C updates the relay server information held thereby.

Then, the third relay server C transmits the updated relay server information to the first relay server A. The first relay server A updates the relay server information using the relay server information transmitted from the third relay server C. The first relay server A notifies the first client terminal A1 that the relay server information has been updated (Step S28: Notify (relay server information)), and further notifies the second client terminal A2 of the same (Step S29: Notify (relay server information)).

The second relay server B applies for subscription of the relay server information to the first relay server A (Step S30: Subscribe ( )). When a change occurs in the condition represented by the relay server information, the first relay server A updates the relay server information held thereby. Then, the first relay server A transmits the updated relay server information to the second relay server B. The second relay server B updates the relay server information using the relay server information transmitted from the first relay server A. The second relay server B notifies the third client terminal B1 that the relay server information has been updated (Step S31: Notify (relay server information)), and further notifies the fourth client terminal B2 of the same (Step S32: Notify (relay server information)).

The second relay server B applies for subscription of the relay server information to the third relay server C (Step S33: Subscribe ( )). When a change occurs in the condition represented by the relay server information, the third relay server C updates the relay server information held thereby. Then, the third relay server C transmits the updated relay server information to the second relay server B. The second relay server B updates the relay server information using the relay server information transmitted from the third relay server C. The second relay server B notifies the third client terminal B1 that the relay server information has been updated (Step S34: Notify (relay server information)), and further notifies the fourth client terminal B2 of the same (Step S35: Notify (relay server information)).

The third relay server C applies for subscription of the relay server information to the second relay server B (Step S36: Subscribe ( )). When a change occurs in the condition represented by the relay server information, the second relay server B updates the relay server information held thereby. Then, the second relay server B transmits the updated relay server information to the third relay server C. The third relay server C updates the relay server information using the relay server information transmitted from the second relay server B. The third relay server C notifies the fifth client terminal C1 that the relay server information has been updated (Step S37: Notify (relay server information)), and further notifies the sixth client terminal C2 of the same (Step S38: Notify (relay server information)).

The third relay server C applies for subscription of the relay server information to the first relay server A (Step S39: Subscribe ( )). When a change occurs in the condition represented by the relay server information, the first relay server A updates the relay server information held thereby. Then, the first relay server A transmits the updated relay server information to the third relay server C. The third relay server C updates the relay server information using the relay server information transmitted from the first relay server A. The third relay server C notifies the fifth client terminal C1 that the relay server information has been updated (Step S40: Notify (relay server information)), and further notifies the sixth client terminal C2 of the same (Step S41: Notify (relay server information)).

Through the above-described process, the first relay server A, the second relay server B and the third relay server C share the updated relay server information immediately when the relay server information is updated. Hence, the first relay server A, the second relay server B and the third relay server C can always obtain activation statuses of the other relay servers and types and log-on statuses of the client terminals connected to the relay servers concerned.

In the case where an increase/decrease in the number or a connection status of the LANs or the client terminals is changed in the relay communication system, at the time of recognizing such a change, one of the relay servers immediately updates the relay group information, the relay server information and the client terminal information in response to the change. Then, the one relay server immediately issues a notice, to the other relay servers listed in the relay group information and the relay server information, that the relay group information and the relay server information have been updated. Moreover, the one relay server immediately issues a notice, to the client terminals listed in the client terminal information, that the relay group information and the relay server information have been updated.

However, even if the other relay servers are listed in the relay group information and the relay server information, the one relay server does not immediately issue the above-described notice to the other relay servers when determining that the other relay servers are in an unconnected state. Moreover, even if the client terminals are listed in the client terminal information, the one relay server does not immediately issue the above-described notice to the client terminals when determining that the client terminals are in an unconnected state.

In such a way, the information regarding the increase/decrease in the number or connection status of the LANs or the client terminals is shared in real time in the entire relay communication system.

Next, a description is provided of creation of the VLAN device information. When the second client terminal A2 logs on to the first relay server A in Step S9 of FIG. 16, the second client terminal A2 transmits a VLAN device information it holds to the first relay server A. As a result, the first relay server A stores the VLAN device information (corresponding to 71-2 of FIG. 13) of the second client terminal A2. In a similar way, when the first client terminal A1 logs on to the first relay server A, the first client terminal A1 transmits a VLAN device information (corresponding to 71-1 of FIG. 13) it holds to the first relay server A. As a result, the first relay server A stores the VLAN device information of the first client terminal A1. In a similar way, when the third client terminal B1 logs on to the second relay server B, the third client terminal B1 transmits a VLAN device information (corresponding to 71-3 of FIG. 13) it holds to the second relay server B. As a result, the second relay server B stores the VLAN device information of the third client terminal B1. In a similar way, when the fourth client terminal B2 logs on to the second relay server B, the fourth client terminal B2 transmits a VLAN device information (corresponding to 71-4 of FIG. 13) it holds to the second relay server B. As a result, the second relay server B stores the VLAN device information of the fourth client terminal B2. In a similar way, when the fifth client terminal C1 logs on to the third relay server C, the fifth client terminal C1 transmits a VLAN device information (corresponding to 71-5 of FIG. 13) it holds to the third relay server C. As a result, the third relay server C stores the VLAN device information of the fifth client terminal C1. In a similar way, when the sixth client terminal C2 logs on to the third relay server C, the sixth client terminal C2 transmits a VLAN device information (corresponding to 71-6 of FIG. 13) it holds to the third relay server C. As a result, the third relay server C stores the VLAN device information of the sixth client terminal C2.

Based on the above, if all of the client terminals have logged on, the following operations are performed. The VLAN device information 71-1 and the VLAN device information 71-2 are stored in the first relay server A. The VLAN device information 71-3 and the VLAN device information 71-4 are stored in the second relay server B. The VLAN device information 71-5 and the VLAN device information 71-6 are stored in the third relay server C.

Figure 21:
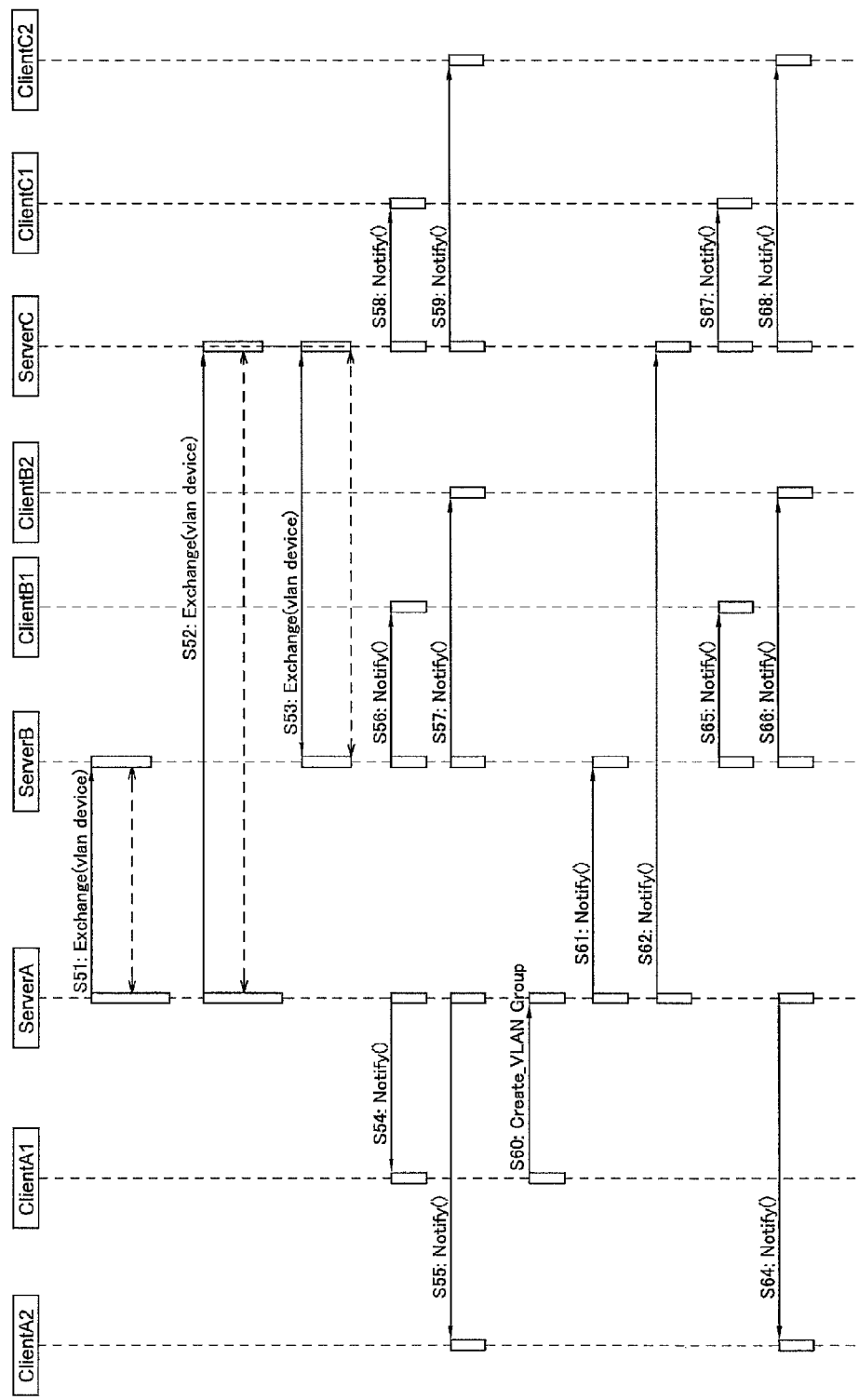
FIG. 21 is a chart showing process regarding sharing of the VLAN device information and the VLAN group information.

With reference to FIG. 21, a description is now provided of the process for creating/sharing the VLAN device information. First, the first relay server A requests the second relay server B to exchange the VLAN device information (Step S51: Exchange (vlan device)). In such way, the first relay server A transmits the VLAN device information to the second relay server B, and the second relay server B transmits the VLAN device information to the first relay server A. The first relay server A and the second relay server B synthesize the VLAN device information, and store the resulting VLAN device information as a new VLAN device information. The first relay server A requests the third relay server C to exchange the VLAN device information (Step S52: Exchange (vlan device)). In such way, the first relay server A transmits the VLAN device information to the third relay server C, and the third relay server C transmits the VLAN device information to the first relay server A. The first relay server A and the third relay server C synthesize the VLAN device information, and store the resulting VLAN device information as a new VLAN device information. The second relay server B requests the third relay server C to exchange the VLAN device information (Step S53: Exchange (vlan device)). In such way, the second relay server B transmits the VLAN device information to the third relay server C, and the third relay server C transmits the VLAN device information to the second relay server B. The second relay server B and the third relay server C synthesize the VLAN device information, and store the resulting VLAN device information as a new VLAN information.

Through the above-described processes, the first relay server A, the second relay server B and the third relay server C own a common VLAN device information (for example, the VLAN device information 70 in FIG. 13).

Moreover, the first relay server A notifies the first client terminal A1 of the VLAN device information (Step S54: Notify ( )), and further notifies the second client terminal A2 of the VLAN device information (Step S55: Notify ( )). The second relay server B notifies the third client terminal B1 of the VLAN device information (Step S56: Notify ( )), and further notifies the fourth client terminal B2 of the VLAN device information (Step S57: Notify ( )). The third relay server C notifies the fifth client terminal C1 of the VLAN device information (Step S58: Notify ( )), and further notifies the sixth client terminal C2 of the VLAN device information (Step S59: Notify ( )).

As a result of the above, all of the client terminals in the first relay group own the common VLAN device information.

A description is now provided of creation/sharing of the VLAN group information. It is possible to display the common VLAN device information (for example, the VLAN device information 70 in FIG. 12) on the display of a relay server and a client terminal. Accordingly, the user can create the VLAN group information while looking at the VLAN device information.

The user of the first client terminal A1 creates the VLAN group information (for example, the VLAN group information 80 in FIG. 15), and stores the VLAN group information in the first relay server A (Step S60: Create_VLANGroup). Specifically, the control unit 122 of the first relay server A creates the VLAN group information in accordance with an instruction from the user. Next, the first relay server A transmits the VLAN group information to the second relay server B (Step S61: Notify ( )), and further transmits the VLAN group information to the third relay server C (Step S62: Notify ( )). The first relay server A notifies the second client terminal A2 of the VLAN group information (Step S64: Notify ( )). The second relay server B notifies the third client terminal B1 of the VLAN group information (Step S65: Notify ( )), and further notifies the fourth client terminal B2 of the VLAN group information (Step S66: Notify ( )). The third relay server C notifies the fifth client terminal C1 of the VLAN group information (Step S67: Notify ( )), and further notifies the sixth client terminal C2 of the VLAN group information (Step S68: Notify ( )).

As a result of the above, all of the relay servers and the client terminals in the first relay group own the common VLAN group information. In such a way, preparation of the VLAN session to be performed among the client terminals in the VLAN group is realized.

Moreover, the user creates the VLAN group information while looking at the VLAN device information, and can thereby set routes for a plurality of the VLAN sessions. That is to say, it is easy to set the routes for the VLAN sessions.

When the VLAN sessions are to be established, the relay servers refer to the relay server information, and can thereby determine whether or not the terminals in the VLAN group are capable of performing communication with one another. Hence, no useless VLAN sessions would be established.

In such a way as described above, in the relay communication system in the present preferred embodiment, the client terminals become capable of communicating as the VLAN devices with one another through the plurality of relay servers which realize the function similar to that of the hub. That is to say, the client terminals which belong to the different LANs become capable of communicating with one another as VLAN devices which belong to the common VLAN.

More specifically, in a connection start instruction for the VLAN session establishment, information regarding the selected VLAN group is included. Hence, when the connection start instruction is executed, such a VLAN session is established, via the relay servers among the client terminals which belong to the VLAN group. By utilizing this VLAN session, the client terminals become capable of communicating with one another using the virtual MAC addresses and the virtual IP addresses assigned thereto. Note that the plurality of relay servers establish the session among themselves in order to realize the function similar to that of the hub.

In such a way, a VLAN network is constructed. Moreover, when a disconnection instruction is inputted, the VLAN session is disconnected, and as a result, such a VLAN network function is stopped. In such a way as described above, the relay servers perform the VLAN session control function to validate/invalidate the VLAN session function for each group of the VLAN group information.

Figure 22:
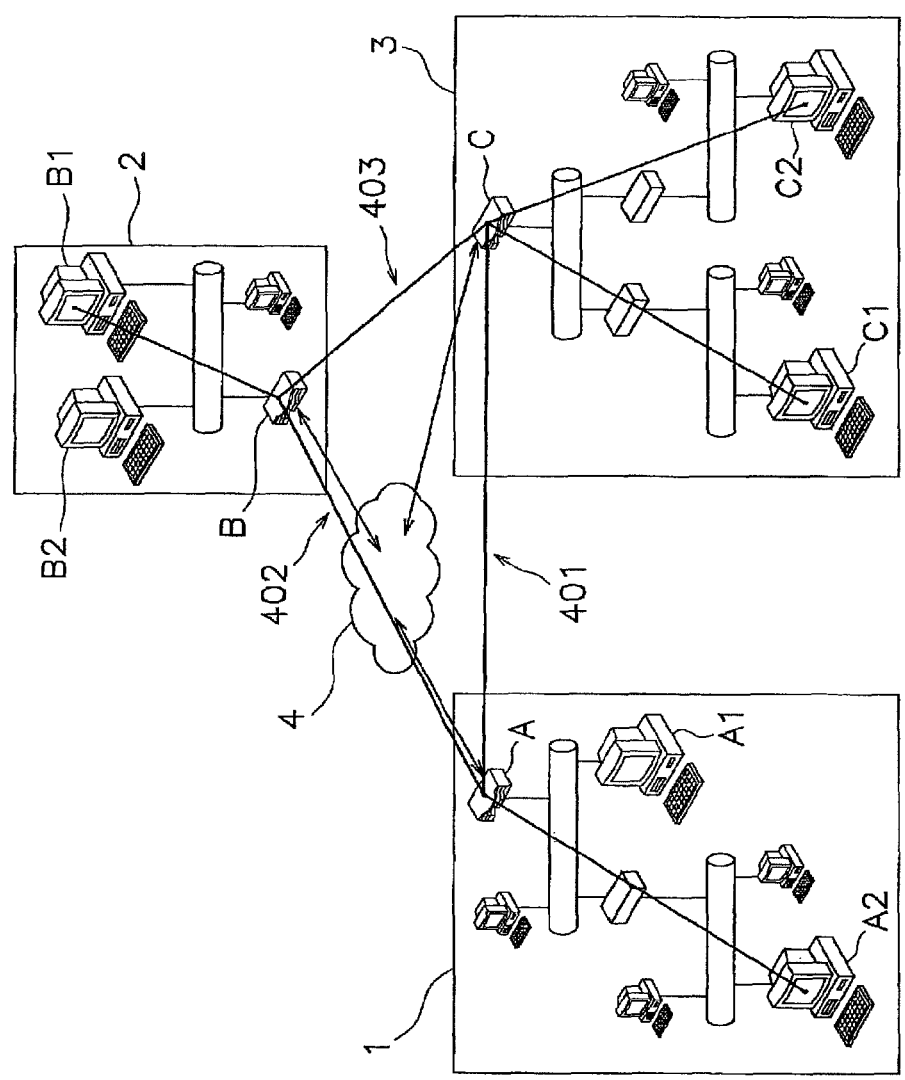
FIG. 22 is a view showing an example of an established VLAN session.

FIG. 22 shows examples of such VLAN sessions. In the VLAN group A, it is possible to establish a VLAN session between the first client terminal A1 and the sixth client terminal C2. In the VLAN group B, it is possible to establish a VLAN session among the second client terminal A2, the third client terminal B1 and the fifth client terminal C1.

In FIG. 22, a first session 401 is set up between the first relay server A and the third relay server C, a second session 402 is set up between the first relay server A and the second relay server B, and a third session 403 is set up between the second relay server B and the third relay server C.

With reference to the block diagram of FIG. 3, a description is now provided of a flow of process in the first client terminal A1 during the VLAN session. The first client terminal A1 receives a communication packet from the first LAN 1 through the LAN interface 221. The LAN interface 221 outputs the communication packet to the LAN driver 251, and the LAN driver 251 outputs the communication packet to the IP packet processing unit 252. In the case where the communication packet includes data regarding the VLAN session, the IP packet processing unit 252 outputs the data to the VLAN session control unit 254. The VLAN session control unit 254 outputs the data to the first VLAN driver 257. The VLAN session control unit 254 outputs data inputted thereto from the first VLAN driver 257, to the IP packet processing unit 252. The IP packet processing unit 252 outputs a communication packet to the LAN interface 221 through the LAN driver 251.

Moreover, with reference to the block diagram of FIG. 4, a description is now provided of a flow of process in the fifth client terminal C1 during the VLAN session. The fifth client terminal C1 receives a communication packet from the third LAN 3 through the LAN interface 321. The LAN interface 321 outputs the communication packet to the LAN driver 351, and the LAN driver 351 outputs the communication packet to the IP packet processing unit 352. In the case where the communication packet includes data regarding the VLAN session, the IP packet processing unit 352 outputs the data to the VLAN session control unit 354. Based on a virtual MAC address of the data, the VLAN session control unit 354 outputs the data to the first VLAN driver 357 or the second VLAN driver 358. The VLAN session control unit 354 outputs data is inputted thereto from the first VLAN driver 357 and second VLAN driver 358, to the IP packet processing unit 352. The IP packet processing unit 352 outputs a communication packet to the LAN interface 321 through the LAN driver 351.

In the present preferred embodiment, when the status of the interface is changed in any of the client terminals, the VLAN device information is updated. Specifically, the control unit of the client terminal updates the VLAN device information in response to the change of the status of the interface. As a result, the updated VLAN device information is shared among the relay servers and the client terminals. Subsequently, the VLAN group information is also updated, and the updated VLAN group information is shared among the relay servers and the client terminals.

In the present preferred embodiment, it is possible for the plurality of VLAN sessions to share one route that is set up among the relay servers. When the communication packet is sent out onto the shared route, VLAN group ID information has been assigned to the communication packet. Hence, in the relay server on the receiving side, a relay destination can be selected/decided based on the VLAN group ID information.

For example, the communication packets in the VLAN group A and the VLAN group B are sent out onto the first session 401 set up between the first relay server A and the third relay server C in FIG. 22. In that case, VLAN group ID information has been assigned to the communication packets, and accordingly, the relay servers on the receiving side can select the relay destinations correctly.

In the relay communication system of the present preferred embodiment, the VLAN group information is constructed, thereby making it possible to establish the VLAN session and to make communication among the communication terminals through the WAN 4. Note that the user can work to construct the VLAN group information while having the VLAN device information displayed to the user, and accordingly, good workability is achieved.

The description has been provided above of one preferred embodiment of the present invention; however, the present invention is not limited to the above-described preferred embodiment, and is modifiable in various ways within the scope of the present invention without departing from the spirit of the invention.

In the preferred embodiment described above, one client terminal belongs to one VLAN group; however, the present invention is not limited to such a preferred embodiment. For example, a client terminal that includes a plurality of owned interfaces may be set so as to belong to VLAN groups different for each of the interfaces.

Preferred embodiments of the present invention can be widely applied to the relay communication system including a plurality of relay servers capable of communicating with one another, a plurality of client terminals, and the LANs to connect the client terminals to the relay servers, and to the relay servers for use in the relay communication system.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A relay server, which is capable of communicating with a first relay server connected to a first network, the relay server functioning as a second relay server connected to a second network, the relay server comprising:
   a relay group information sharing unit that shares relay group information between the first relay server and the second relay server, the relay group information indicating that the first relay server and the second relay server constitute a relay group;
   a relay server information sharing unit that shares relay server information between the first relay server and the second relay server, the relay server information including activation information of the first relay server, activation information of the second relay server, activation/registration information of a client terminal connected to the first relay server, and activation/registration information of a client terminal connected to the second relay server;
   a VLAN device information sharing unit that shares VLAN device information between the first relay server and the second relay server, the VLAN device information including interface information of a plurality of client terminals capable of functioning as VLAN devices;
   a VLAN group creation unit that creates a plurality of VLAN groups by selecting at least some of the plurality of client terminals capable of functioning as VLAN devices by using the VLAN device information, and that creates VLAN group information by creating a virtual MAC address and a virtual IP address for each of the selected client terminals of each of the plurality of VLAN groups;
   a VLAN group information sharing unit that shares the VLAN group information among the first relay server, the second relay server, the client terminal connected to the first relay server, and the client terminal connected to the second relay server;

a VLAN session establishment unit that allows a plurality of client terminals capable of functioning as the VLAN devices to function as VLAN terminals, and while referring to the relay server information, establish a VLAN session for each group indicated in the VLAN group information; and a VLAN connection function control unit that validates/invalidates a VLAN connection function for each group indicated in the VLAN group information, the VLAN connection function establishing a VLAN session between specific ones of the VLAN devices in different ones of the groups indicated in the VLAN group information; wherein the VLAN device information includes names of the client terminals, and a number of the interfaces of each of the client terminals that function as the VLAN terminals.

2. The relay server according to claim 1, further comprising a display device that displays the VLAN device information.

3. The relay server according to claim 1, further comprising a VLAN device information update unit that updates the VLAN device information in response to status changes of interfaces of the client terminals capable of functioning as the VLAN devices.

4. The relay server according to claim 1, wherein the virtual addresses include virtual MAC addresses.

5. The relay server according to claim 1, wherein, in response to a plurality of the VLAN sessions being established between the first relay server and the second relay server, one route between the first relay server and the second relay server is shared by the plurality of VLAN sessions.

6. A relay communication system, comprising:
a first network;
a second network;
a first relay server connected to the first network; and
a second relay server connected to the second network; wherein each of the first relay server and the second relay server includes:
a relay server information sharing unit that shares relay server information between the first relay server and the second relay server, the relay server information including activation information of the first relay server, activation information of the second relay server, activation/registration information of a client terminal connected to the first relay server, and activation/registration information of a client terminal connected to the second relay server;

a VLAN device information sharing unit that shares VLAN device information between the first relay server and the second relay server, the VLAN device information including interface information of a plurality of client terminals capable of functioning as VLAN devices;

a VLAN group creation unit that creates a plurality of VLAN groups by selecting at least some of the plurality of client terminals capable of functioning as VLAN devices by using the VLAN device information, and that creates VLAN group information by creating a virtual MAC address and a virtual IP address for each of selected client terminals of each of the plurality of VLAN groups;

a VLAN group information sharing unit that shares the VLAN group information among the first relay server, the second relay server, the client terminal connected to the first relay server, and the client terminal connected to the second relay server;

a VLAN session establishment unit that allows a plurality of client terminals capable of functioning as the VLAN devices to function as VLAN terminals, and while referring to the relay server information, establish a VLAN session for each group indicated in the VLAN group information; and a VLAN connection function control unit that validates/invalidates a VLAN connection function for each group indicated in the VLAN group information, the VLAN connection function establishing a VLAN session between specific ones of the VLAN devices in different ones of the groups indicated in the VLAN group information;

wherein the VLAN device information includes names of the client terminals, and a number of the interfaces of each of the client terminals that function as the VLAN terminals.

7. The relay communication system according to claim 6, further comprising a display device that displays the VLAN device information.

8. The relay communication system according to claim 6, further comprising a VLAN device information update unit that updates the VLAN device information in response to status changes of interfaces of the client terminals capable of functioning as the VLAN devices.

9. The relay communication system according to claim 6, wherein the virtual addresses include virtual MAC addresses.

10. The relay communication system according to claim 6, wherein, in response to a plurality of the VLAN sessions being established between the first relay server and the second relay server, one route between the first relay server and the second relay server is shared by the plurality of VLAN sessions.

* * * * *